(12) United States Patent
Dumitrean (10) Patent No.: US 8,364,663 B2
(45) Date of Patent: Jan. 29, 2013

(54) TOKENIZED JAVASCRIPT INDEXING SYSTEM

(75) Inventor: Vladimir Dumitrean, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 621 days.

(21) Appl. No.: 12/205,557

(22) Filed: Sep. 5, 2008

(65) Prior Publication Data

US 2010/0076980 A1    Mar. 25, 2010

(51) Int. Cl.
*G06F 17/30* (2006.01)
(52) U.S. Cl. .................. 707/711; 707/741; 707/752
(58) Field of Classification Search .................. 707/741, 707/711, 752
See application file for complete search history.

(56) References Cited

U.S. PATENT DOCUMENTS

| | | | |
|---|---|---|---|
| 5,701,459 A * | 12/1997 | Millett et al. ........................... 1/1 |
| 6,076,051 A | 6/2000 | Messerly et al. |
| 6,169,993 B1 | 1/2001 | Shutt et al. |
| 6,233,575 B1 | 5/2001 | Agrawal et al. |
| 6,363,377 B1 | 3/2002 | Kravets et al. |
| 6,658,453 B1 | 12/2003 | Dattatri |
| 6,775,666 B1 | 8/2004 | Stumpf et al. |
| 6,834,276 B1 | 12/2004 | Jensen et al. |
| 7,080,091 B2 | 7/2006 | Matsuda |
| 7,577,938 B2 | 8/2009 | Bent et al. |
| 7,689,663 B2 * | 3/2010 | Kinnan et al. ................. 709/217 |
| 7,698,256 B1 | 4/2010 | Wang |
| 7,827,160 B2 * | 11/2010 | Kuhr et al. ..................... 707/705 |
| 2002/0147743 A1 * | 10/2002 | Le et al. ......................... 707/505 |
| 2004/0139426 A1 * | 7/2004 | Wu ................................ 717/120 |
| 2005/0164704 A1 | 7/2005 | Winsor |
| 2005/0228680 A1 | 10/2005 | Malik |
| 2006/0092055 A1 * | 5/2006 | Baldwin et al. ................. 341/87 |
| 2006/0235878 A1 * | 10/2006 | Shipp et al. ................ 707/104.1 |
| 2007/0078887 A1 * | 4/2007 | Harvey et al. ................. 707/102 |
| 2009/0210781 A1 | 8/2009 | Hagerott et al. |

OTHER PUBLICATIONS

Towards automatic multilevel indexing for Thai text information retrieval, Kawtrakul, A, Thumkanon, C., McFetridge, P., Circuits and Systems, The 1998 IEEE Asia-Pacific Conference, 1998.*
Code optimization for tagged-token dataflow machines, APW Bohm, J Sargeant, Computers, IEEE Transactions, 1989.*
Unknown, "Public Domain Distributed Database Search Engine Project", printed from http://www.officesoon.com/doc/55233-Public-Domain-distributed-database-Search-Engine-project-PDSE-for-/, printed on Jul. 7, 2008, 4 pages, US.
Unknown, "Enterprise Search Architecture," printed from http://msdn.microsoft.com/en-us/library/ms570748.aspx, printed on Jul. 7, 2008, 6 pages, US.
Bozzon et al., "Conceptual Modeling and Code Generation for Rich Internet Applications," ICWE '06, Jul. 2006, ACM Publishing, 8 pages, US.

* cited by examiner

*Primary Examiner* — Tony Mahmoudi
*Assistant Examiner* — Nan Hutton
(74) *Attorney, Agent, or Firm* — Senniger Powers LLP (57) ABSTRACT

A client generates an index token for each of a plurality of data objects received from a server as a function of at least one of the plurality of fields of the data object. The client creates an index for the plurality of data objects based on the generated index token for each data object. The client may then utilize the index to search plurality of data objects to identify and render a subset of the data objects.

16 Claims, 5 Drawing Sheets

TOKENIZED JAVASCRIPT INDEXING SYSTEM

BACKGROUND

Through the use of web applications, such as AJAX web applications, clients can receive large amounts of data from a server. Once the data has been received, the data may be manipulated or searched via the web application on the client without further interaction with the server. However, performance degrades as larger number of complex data objects are manipulated or searched on the client. Furthermore, generating an index for the data by the client or receiving an index for the data from a server may increase the application startup-time and lead to an unacceptable user experience.

SUMMARY

Aspects of the invention overcome one or more vulnerabilities associated with manipulating and searching data objects received from a server by generating an index from index tokens associated with a data object. The index token is generated from a tokenized data object. Once the data objects are indexed, they may be searched by the client.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
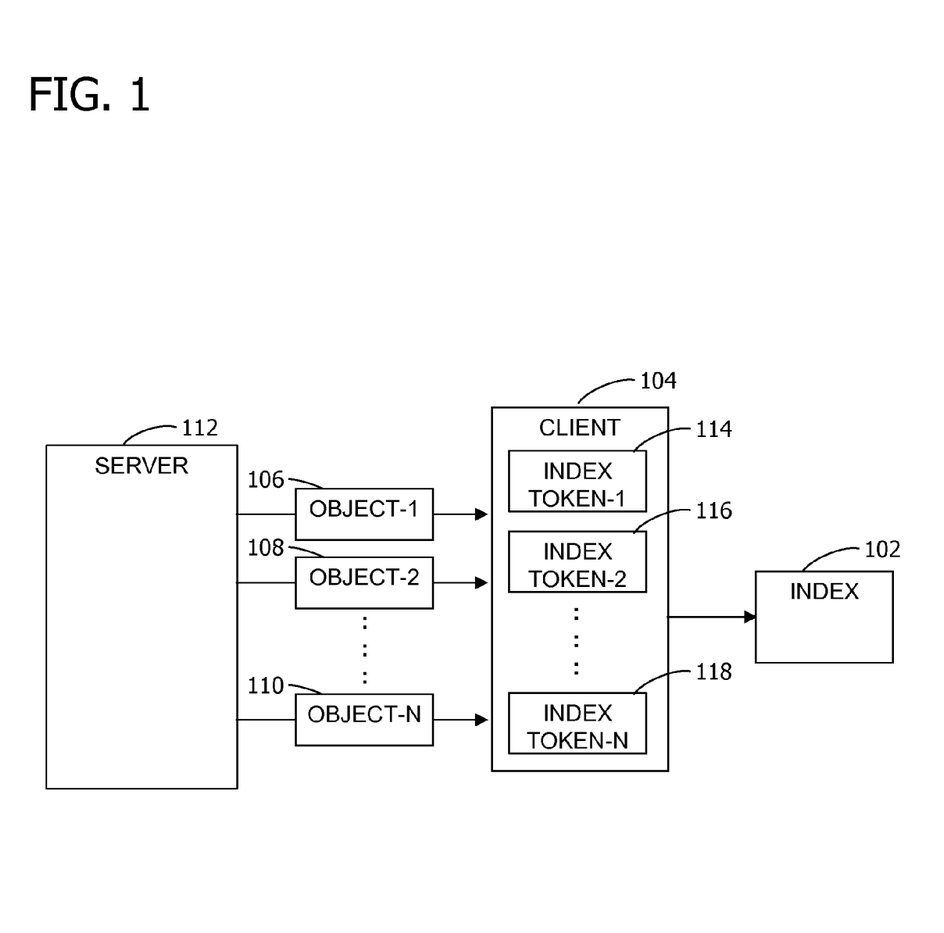
FIG. 1 is a block diagram illustrating one example of a suitable computing system environment in which the invention may be implemented.

In an embodiment, the invention includes generating an index from index tokens associated with data objects received from a server by a client. FIG. 1 is an exemplary block diagram illustrating a system for creating an index 102 by a client 104 for a plurality of data objects (e.g., object-1 106, object-2 108, object-N 110) received from a server 112. Each data object comprises a plurality of fields. The client 104 generates an index token (e.g., index token-1 114, index token-2 116, index token-N 118) for each of the plurality of data objects (e.g., object-1 106, object-2 108, object-N 110) as a function of at least one of the plurality of fields of the data object. In an embodiment, the plurality of data objects are contact data objects associated with a user and the index token is generated from one of more of the following contact data object fields: email address, first name, and last name.

Alternatively, the server 112 generates an index token (e.g., index token-1 114, index token-2 116, index token-N 118) for each of the plurality of data objects (e.g., object-1 106, object-2 108, object-N 110) as a function of at least one of the plurality of fields of the data object. The generated index tokens (e.g., index token-1 114, index token-2 116, index token-N 118) are associated with its corresponding data object (e.g., object-1 106, object-2 108, object-N 110) and the generated index tokens are sent to the client 104 in addition to the plurality of data objects. For example, the index token may be a header to the data object. Alternatively, the index tokens for each object may be sent to the client 104 in a file separate from the data objects.

The client 104 creates an index 102 for the plurality of data objects (e.g., object-1 106, object-2 108, object-N 110) based on the generated index token (e.g., index token-1 114, index token-2 116, index token-N 118) for each data object. In an embodiment, the plurality of data objects and the created index are embedded into a JavaScript webform.

In another embodiment, the client 104 receives a search term input by a user via a web form. The client 104 determines a search token based on the received search and identifies a subset of the plurality of data objects (e.g., object-1 106, object-2 108, object-N 110) by searching the index 102 as a function of the search token. The client 102 then renders the identified subset of the plurality of data objects to the user.

Figure 2:
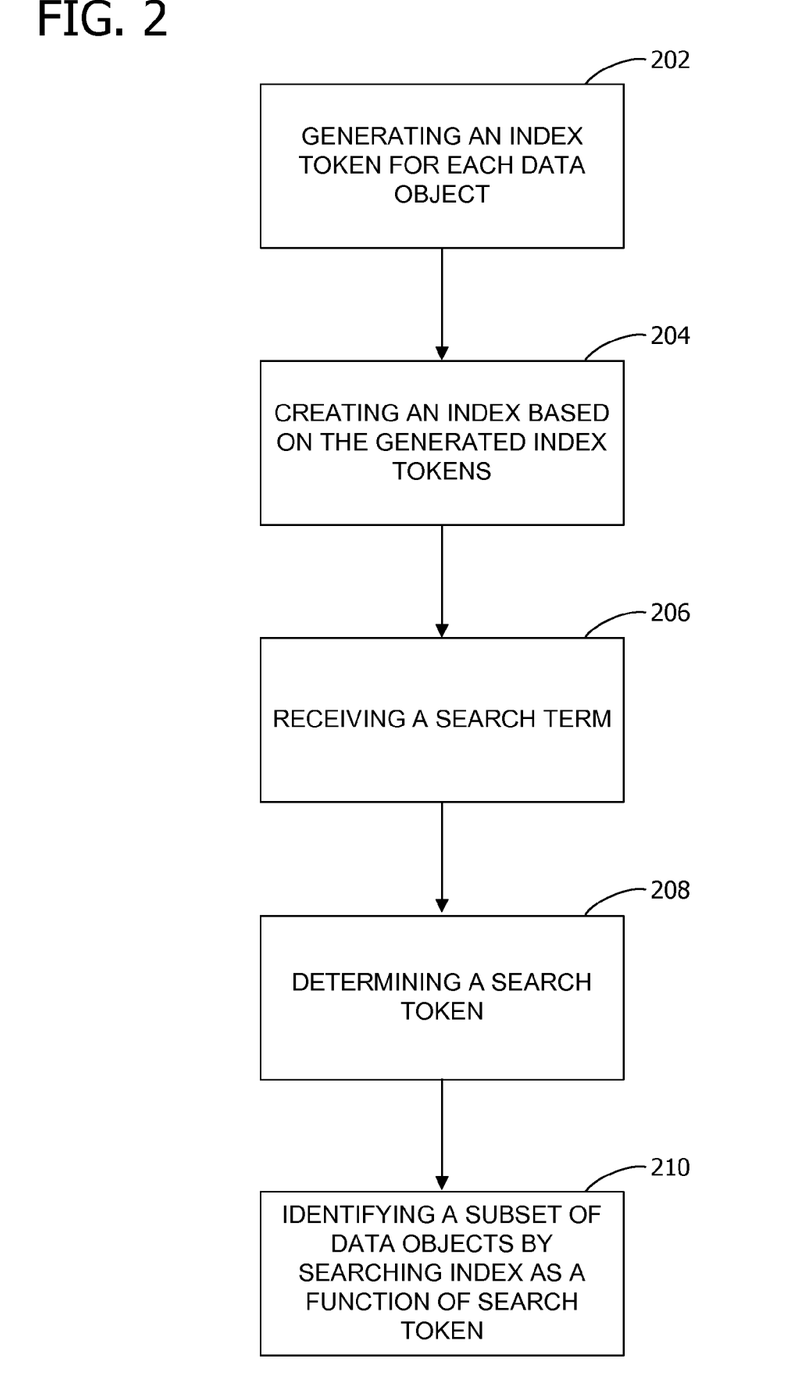
FIG. 2 is a flow diagram for a method for creating an index for a plurality of data objects.

FIG. 2 is a flow diagram for a method for creating an index 102 for a plurality of data objects (e.g., object-1 106, object-2 108, object-N 110). Each data object comprises a plurality of fields.

At 202, the client 104 generates the index token (e.g., index token-1 114, index token-2 116, index token-N 118) for each of the plurality of data object (e.g., object-1 106, object-2 108, object-N 110) as a function of at least one of the plurality of fields of the data object. For example, each field of each data object may be tokenized (broken into pieces). In an embodiment, the index token is the first character of each field of the contact data object. Alternatively, the index token may be the first two characters of commonly searched text fields of the data objects.

In an embodiment, the plurality of data objects are stored in an email server (e.g., server 112) and the generating occurs on a client (104) in response to receiving the plurality of data objects from the email server. In another embodiment, the plurality of data objects are contact data objects associated with a user and the index token is generated from one of more of the following contact data object fields: email address, first name, and last name.

Alternatively, the server 112 generates the index token (e.g., index token-1 114, index token-2 116, index token-N 118) for each of the plurality of data objects (e.g., object-1 106, object-2 108, object-N 110) as a function of at least one of the plurality of fields of the data object. The generated index tokens (e.g., index token-1 114, index token-2 116, index token-N 118) are associated with its corresponding data object (e.g., object-1 106, object-2 108, object-N 110) and the generated index tokens are sent to the client 104 in addition to the plurality of data objects. For example, the index token may be a header to the data object. Alternatively, the index tokens for each data object may be sent to the client 104 in a file separate from the data objects.

At 204, the client 104 creates an index 102 for the plurality of data objects (e.g., object-1 106, object-2 108, object-N 110) based on the generated index token (e.g., index token-1 114, index token-2 116, index token-N 118) for each data object. In an embodiment, the plurality of data objects and the created index are embedded into a JavaScript webform.

At 206, the client 104 receives a search term. In an embodiment, the search term is input into a search form by a user. At 208, the client 104 determines a search token based on the received search term.

At 210, the client 104 identifies a subset of the plurality of data objects (e.g., object-1 106, object-2 108, object-N 110) by searching the index 102 as a function of the search token. In an embodiment, the client 104 renders the identified subset of the plurality of data objects to the user.

Figure 3:
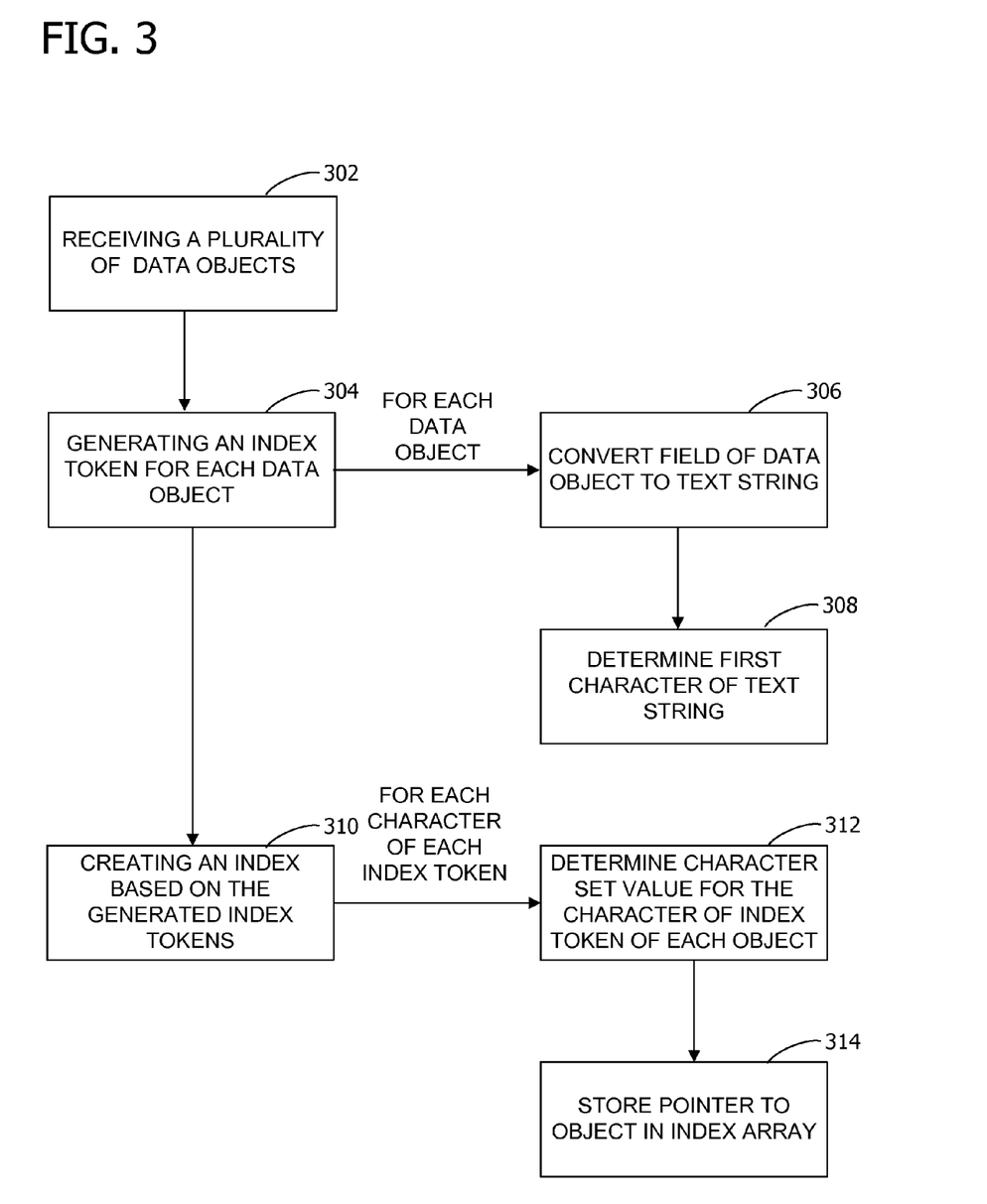
FIG. 3 is an exemplary flow diagram for a method for creating an index array for a plurality of contact data objects FIG. 4. is an exemplary block diagram illustrating an embodiment of an index array.

FIG. 3 is a flow diagram for a method for creating an index array (e.g., index 102) for a plurality of contact data objects (e.g., object-1 106, object-2 108, object-N 110). Each contact data object comprises a plurality of fields. In an embodiment, the fields of the contact data object include one of more of the following: email address, first name, and last name.

At 302, the client receives the plurality of contact data objects (e.g., object-1 106, object-2 108, object-N 110) from an email server (e.g., server 112). At 304, in response to the receiving the plurality of contact data objects (e.g., object-1 106, object-2 108, object-N 110), the client generates an index token (e.g., index token-1 114, index token-2 116, index token-N 118) for each of the plurality of contact data objects as a function of at least one of the plurality of fields of the contact data object.

At 306, the client 104 generates the index token (e.g., index token-1 114, index token-2 116, index token-N 118) for each contact data object (e.g., object-1 106, object-2 108, object-N 110) by converting a value of each field of each into a text string, if the value of the field is not a text string.

At 308, the client 104 then determines the first character of each text string of the value of each field of the contact data object (e.g., object-1 106, object-2 108, object-N 110). The client 104 generates the index token (e.g., index token-1 114, index token-2 116, index token-N 118) based each of the determined first characters. In an embodiment, the index token generated for each data object does not include duplicate determined first characters.

For example, the following is a contact data object (e.g., object-1 106, object-2 108, object-N 110) with three fields, first name, last name, and email address:
Joe, Smith, joe.smith@hotmail.com
The first character of the first name is "j", the first character of the last name is "s", and the first character of the email address is "j." The client 104 may concatenate the first characters together to generate the index token "jsj." In the embodiment where the index token (e.g., index token-1 114, index token-2 116, index token-N 118) does not include duplicate first characters, the generated index token is "js".

At 310, the client 104 creates the index array (e.g., index 102) for the plurality of contact data objects (e.g., object-1 106, object-2 108, object-N 110) based on the index token (e.g., index token-1 114, index token-2 116, index token-N 118) for each contact data object. The index array is created by processing each contact data object of the plurality of contact data objects and the corresponding index token generated for each contact data object.

At 312, for each character of the corresponding index token (e.g., index token-1 114, index token-2 116, index token-N 118), the client 104 determines a character set value for the character. The character set value is a unique numeric code representing the character in the character set. For example, the character set may include one or more of the following: Unicode, UTF-8, ASCII, UCS-2, and UTF-16.

At 314, the client 104 stores a pointer to the contact data object (e.g., object-1 106, object-2 108, object-N 110) in the index array (e.g., index 102) element corresponding to the character set value. The index array includes one element for each character set value of the character set. In an embodiment, the plurality of contact data objects and the index array are embedded into a JavaScript webform.

The following is exemplary script in pseudo-code for creating the index array using a Unicode character set:

```
function buildIndex(contactArray, tokenIndex)
{
    jsSearchIndexArray = new Array
    (for every contact in 'contactArray')
    {
        tokens = (contact at index 'tokenIndex')
        (for every token in 'tokens')
        {
            unicodeValue = (Unicode value of token)
            (jsSearchIndexArray at index 'unicodeValue') =
                (append the index of the current 'contact')
        }
    }
}
```

And, continuing with the example above for the contact data object "Joe, Smith, joe.smith@hotmail.com" and index token "js", assume there are two array structures, one of the index array and the other for an array of contact data objects. Now suppose the contact data object is stored in element "1" of the contact data object array. When the script processes the "Joe, Smith" contact data object, two entries will be entered into the index array. The first at the element corresponding to the Unicode value of "j" and the second at the Unicode value of "s". The element, "1", corresponding to the "Joe, Smith" contact data object in the contact data object array is appended to the element corresponding to the Unicode value of "j" and the Unicode value of "s."

Advantageously, once the index array (e.g., index 102) has been created, the index array may be used to efficiently search for contact data objects (e.g., object-1 106, object-2 108, object-N 110). The client 104 renders a search form to a user which allows the user inputs a search term into a search field of the form. The client 104 determines the first character input by the user into the search field and converts the input first character into the corresponding character set value. The character set value is the unique numeric code representing the input first character in the character set. The client 104 identifies a subset of the plurality of contact data objects (e.g., object-1 106, object-2 108, object-N 110) to the user based on the pointers stored at the index array element corresponding to the converted character set value. The client 104 may then render the identified subset of the plurality of data objects to the user.

For example, suppose the user inputs "j" into the search form, contact data objects (e.g., object-1 106, object-2 108, object-N 110) with a first name, last name or email address that begins with a "j" are identified by searching the index array for the element corresponding to the Unicode value of "j". Advantageously, the search is extremely efficient with a O(1) lookup. If needed, further searches can be done iteratively over identified contact data objects since the search area is much smaller than the set of all contact data objects. These additional searches may include another tokenized index, other type index, a b-tree search, or a linear search. One skilled in the art would select the type of search and index by analyzing the time to create the additional index versus the time to perform a the search versus the number of times the additional index is needed.

Figure 4:
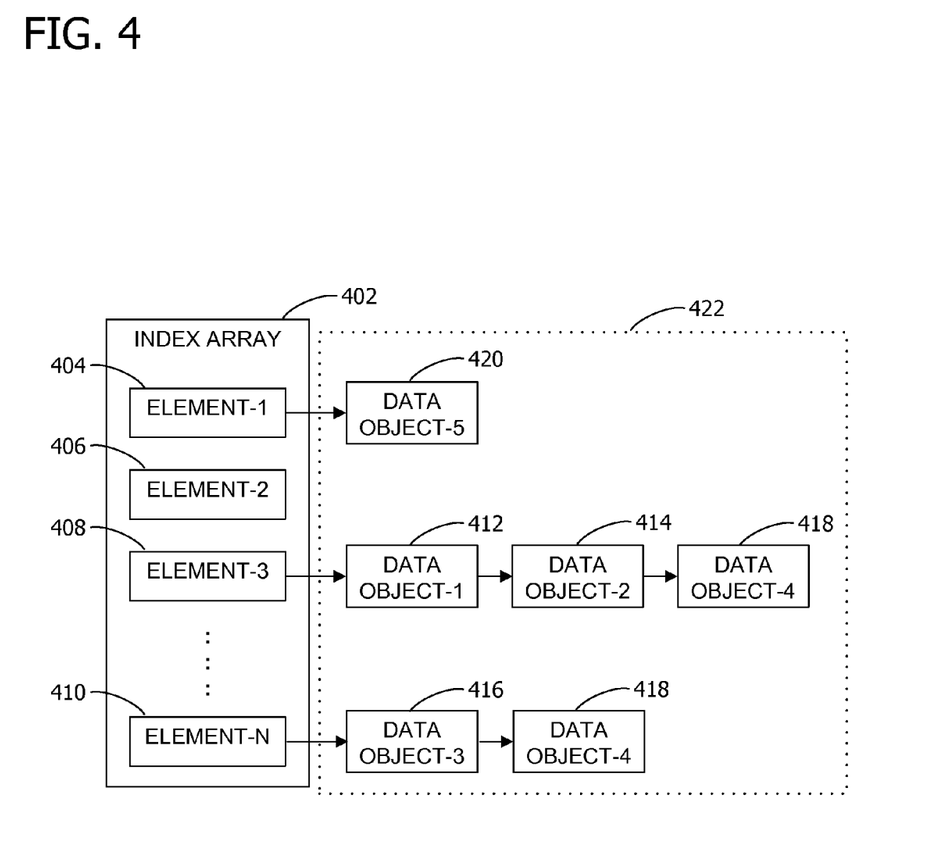

FIG. 4. is an exemplary block diagram illustrating an embodiment of the index array 402 (e.g., index 112). The index array 402 comprises a plurality of elements (e.g., element-1 404, element-2 406, element-4 408, element-N 410). The index array 402 includes one element for each character set value of the character set. For example, if the character set is ASCII, the index array 302 would include elements 127 elements, 0 to 126.

Pointers to the plurality of data objects 422 are stored at corresponding elements (e.g., element-1 404, element-2 406, element-4 408, element-N 410) based on the generated index token (e.g., index token-1 114, index token-2 116, index token-N 118). For example, a pointer to data object-5 420 is stored at index array[1]; pointers to data object-1 412, data object-2 414, and data object-4 418 are stored at index array [3]; and pointers to data object-3 416 and data object-4 418 are stored at index array[N].

Figure 5:
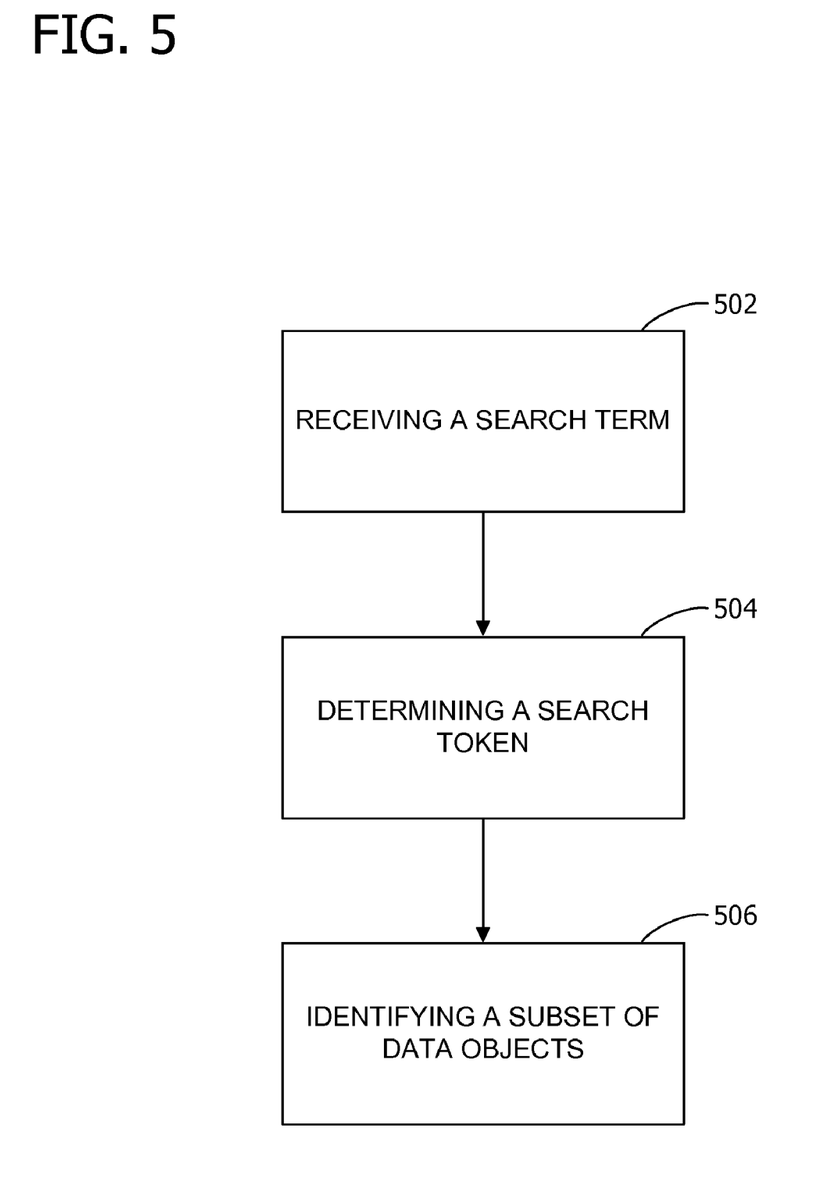
FIG. 5 is an exemplary flow diagram for a method for searching an index array.

FIG. 5 is a flow diagram for a method for searching an index array 112. At 502, the client 104 receives a search term. At 504, the client 104 determines a search token as a function of the received search term. The search token corresponds to at least one entry in the index array 112. In an embodiment, the search token is the first character of the received search term. For example, the search term may have been input as part of a web application where identified contact data objects are displayed as the search term is entered. In this example, after the user types a character, the application renders a list of contact objects that have a last name (or some other field or combination of fields of the contact data object) beginning with the typed character. At that point, the user may continue to type additional characters to narrow the search results or the user may select one of the rendered contact data objects.

At 506, the client 104 identifies a subset of data objects (e.g., object-1 106, object-2 108, object-N 110) from a plurality of data objects by searching the index array (e.g., index 112) as a function of the search token. The index array is created for the plurality of data objects based on an index token (e.g., index token-1 114, index token-2 116, index token-N 118) for each data object. The index tokens are generated for each of the plurality of data objects as a function of at least one of a plurality of fields of each data object.

Referring again to FIG. 1, FIG. 1 shows one example of a general purpose computing device in the form of a computer (e.g., client 104, server 112). In one embodiment of the invention, a computer such as the computer (e.g., client 104, server 112) is suitable for use in the other figures illustrated and described herein. Computer (e.g., client 104, server 112) has one or more processors or processing units and a system memory.

The computer (e.g., client 104, server 112) typically has at least some form of computer readable media. Computer readable media, which include both volatile and nonvolatile media, removable and non-removable media, may be any available medium that may be accessed by computer (e.g., client 104, server 112). By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., client 104, server 112). Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer (e.g., client 104, server 112) may also include other removable/non-removable, volatile/nonvolatile computer storage media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The drives or other mass storage devices and their associated computer storage media discussed above provide storage of computer readable instructions, data structures, program modules and other data for the computer (e.g., client 104, server 112).

A user may enter commands and information into computer (e.g., client 104, server 112) through input devices or user interface selection devices such as a keyboard and a pointing device (e.g., a mouse, trackball, pen, or touch pad). Other input devices (not shown) may include a microphone, joystick, game pad, satellite dish, scanner, or the like. These and other input devices are connected to processing unit through a user input interface that is coupled to system bus, but may be connected by other interface and bus structures, such as a parallel port, game port, or a Universal Serial Bus (USB). A monitor or other type of display device is also connected to system bus via an interface. In addition to the monitor, computers often include other peripheral output devices (not shown) such as a printer and speakers, which may be connected through an output peripheral interface (not shown).

The computer (e.g., client 104, server 112) may operate in a networked environment using logical connections to one or more remote computers. The remote computer may be a personal computer, a server, a router, a network PC, a peer device or other common network node, and typically includes many or all of the elements described above relative to computer (e.g., client 104, server 112). The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer (e.g., client 104, server 112) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer (e.g., client 104, server 112), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., client 104, server 112) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for creating an index array for a plurality of contact data objects, each contact data object comprising a plurality of fields, comprising:
   receiving the plurality of contact data objects from an email server;
   in response to the receiving, generating an index token for each of the plurality of contact data objects as a function of at least one of the plurality of fields of the contact data object, wherein the generating comprises:
      for each of the plurality of contact data objects:
         converting a value of each field of the contact data object into a text string, if the value of the field is not a text string; and
         determining the first character of each text string of the value of each field wherein the generated index token comprises each of the determined first characters,
      wherein the index token generated for each contact data object does not include duplicate determined first characters;
   creating the index array including elements corresponding to each of the plurality of contact data objects based on the index token for each contact data object, wherein the creating comprises:
   for each contact data object of the plurality of contact data objects and the corresponding index token generated for each contact data object:
      for each character of the corresponding index token:
         determining a character set value for the character, wherein the character set value is a unique numeric code representing the character in the character set; and
         storing a pointer to the contact data object in the index array element corresponding to the character set value wherein the index array includes one element for each character set value of the character set; and
   further comprising embedding the received plurality of data objects and embedding the created index for the received plurality of data objects into a search form for display to a user.

2. The method of claim 1, wherein the plurality of contact data objects are associated with a user.

3. The method of claim 1, wherein the plurality of contact data objects are stored on the email server and the generating occurs on a client in response to receiving the plurality of data objects from the email server.

4. The method of claim 1, further comprising:
   receiving a search term;

determining a search token based on the received search term;

identifying a subset of the plurality of contact data objects by searching the index as a function of the search token.

5. The method of claim 4, wherein the search term is input into the search form by the user, said method further comprising rendering the identified subset of the plurality of contact data objects to the user.

6. The method of claim 1, wherein the fields of the contact data object include one of more of the following: email address, first name, and last name.

7. The method of claim 1, wherein the plurality of contact data objects and the index array are embedded into a JavaScript webform.

8. The method of claim 1, further comprising:

rendering the search form to the user wherein the user inputs a search term into a search field of the form;

determining the first character input by the user into the search field;

converting the input first character into the corresponding character set value wherein the character set value is the unique numeric code representing the input first character in the character set;

identifying a subset of the plurality of contact data objects to the user based on the pointers stored at the index array element corresponding to the converted character set value.

9. The method of claim 8, further comprising rendering the identified subset of the plurality of data objects to the user.

10. The method of claim 1, wherein the character set includes one or more of the following: Unicode, UTF-8, ASCII, UCS-2, and UTF-16.

11. A method for searching an index array, comprising:

receiving a search term;

determining a search token as a function of the received search term wherein the search token corresponds to at least one entry in the index array, said index array including elements corresponding to a plurality of data objects;

identifying a subset of the data objects from the plurality of data objects of the index array by searching the index array as a function of the search token, said index array being creating for the plurality of data objects based on an index token for each data object, said index tokens being generated for each of the plurality of data objects as a function of at least one of a plurality of fields of each data object, wherein the generating comprises:

for each of the plurality of contact data objects:

converting a value of each field of the data object into a text string, if the value of the field is not a text string;

determining the first character of each text string of the value of each field wherein the generated index token comprises each of the determined first characters; and generating an index token for the contact data object based on the determining first character;

wherein the index token generated for each contact data object does not include duplicate determined first characters; and, embedding each of the plurality of data objects and the created index for the plurality of data objects into a webform.

12. The method of claim 11, said method further comprising creating an index array including elements corresponding to each of the plurality of data objects based on the index token for each data object.

13. The method of claim 12, wherein the creating comprises:

for each data object of the plurality of data objects and the corresponding index token generated for each data object:

for each character of the corresponding index token:

determining a character set value for the character, wherein the character set value is a unique numeric code representing the character in the character set; and storing a pointer to the data object in the index array element corresponding to the character set value wherein the index array includes one element for each character set value of the character set.

14. The method of claim 13, further comprising:

rendering the webform to a user, wherein the user inputs a search term into a search field of the form;

determining the first character input by the user into the search field; converting the input first character into the corresponding character set value wherein the character set value is the unique numeric code representing the input first character in the character set;

identifying a subset of the plurality of data objects to the user based on the pointers stored at the index array element corresponding to the converted character set value.

15. The method of claim 14, further comprising rendering the identified subset of the plurality of data objects to the user.

16. The method of claim 15, wherein the character set includes one or more of the following: Unicode, UTF-8, ASCII, UCS-2, and UTF-16.

* * * * *